United States Patent [19]
Doi et al.

[11] Patent Number: 5,565,070
[45] Date of Patent: Oct. 15, 1996

[54] SOLVENT VAPOR SUCKING METHOD AND SOLVENT RECOVERING APPARATUS

[75] Inventors: Akira Doi; Hiroshi Obinata; Yoshikazu Takano, all of Nagano-ken; Osamu Matsumura, Tokyo, all of Japan

[73] Assignee: Morikawa Industries Corporation, Japan

[21] Appl. No.: 287,826

[22] Filed: Aug. 9, 1994

[51] Int. Cl.$^6$ .............................. B01D 3/14; B01D 11/04
[52] U.S. Cl. .................... 203/91; 203/26; 203/87; 202/168; 202/186; 202/205; 134/11; 134/12
[58] Field of Search .................. 203/26, 87, 91; 202/168–170, 182, 186, 205; 134/10–12, 107–111; 123/520, 519, 557; 48/219; 261/153, DIG. 83; 95/247, 250, 251

[56] References Cited

U.S. PATENT DOCUMENTS

| | | | |
|---|---|---|---|
| 2,017,773 | 10/1935 | Smith et al. | 134/10 |
| 2,617,759 | 11/1952 | Joyner | 202/186 |
| 2,920,946 | 1/1960 | Weaver et al. | 48/219 |
| 3,607,662 | 9/1971 | Glover | 203/87 |
| 4,091,825 | 5/1978 | Baker | 134/10 |
| 4,399,079 | 8/1983 | Lowe | 261/DIG. 83 |
| 4,537,660 | 8/1985 | McCord | 202/186 |
| 4,830,710 | 5/1989 | Thompson | 134/12 |
| 5,017,240 | 5/1991 | Brown | 134/10 |
| 5,051,135 | 9/1991 | Tanaka et al. | 134/12 |
| 5,417,769 | 5/1995 | Gerard et al. | 134/11 |
| 5,427,077 | 6/1995 | Gilbert | 261/DIG. 83 |

FOREIGN PATENT DOCUMENTS

| | | | |
|---|---|---|---|
| 0216833 | 1/1925 | United Kingdom | 261/DIG. 83 |

*Primary Examiner*—Robert J. Warden
*Assistant Examiner*—Theresa T. Snider
*Attorney, Agent, or Firm*—Price, Heneveld, Cooper, DeWitt & Litton

[57] ABSTRACT

A method for recovering solvent vapor in a manner which requires less power using an apparatus which is smaller in size, has a longer life, and is capable of being operated without reducing recovering efficiency, including locating an inlet of a suction pipe at a position within the container between the liquid surface of the solvent and an upper edge of the container, wherein the opening of the suction pipe is open downward, and drawing the vapor from the upper surface of the solvent in the container. The apparatus for carrying out this method includes a solvent container provided with a heater inside a lower part of the container, the container having an opening at the upper part thereof, a cooling device provided inside the container; a suction pipe disposed in the container such that an opening of the pipe is located below an upper edge of the container wherein the opening of the suction pipe is oriented downward; a suction device in fluid communication with the interior of the container by the suction pipe; and a solvent recovering device connected to the suction device. The vapor produced by the solvent in the container is drawn off by a compressor through the suction pipe. The vapor is condensed and recovered by the condensing device have more than two low-temperature condensers.

10 Claims, 6 Drawing Sheets

SOLVENT VAPOR SUCKING METHOD AND SOLVENT RECOVERING APPARATUS

BACKGROUND OF THE INVENTION

1. Field of the Invention

The present invention relates to a method of sucking vapor of organic solvent employed in, for example, a cleaning device in various industries, as well as an apparatus for recovering the solvent from the vapor. In this invention, the word "vapor" means either misty gas or vaporous gas.

2. Description of the Prior Art

Figure 9:
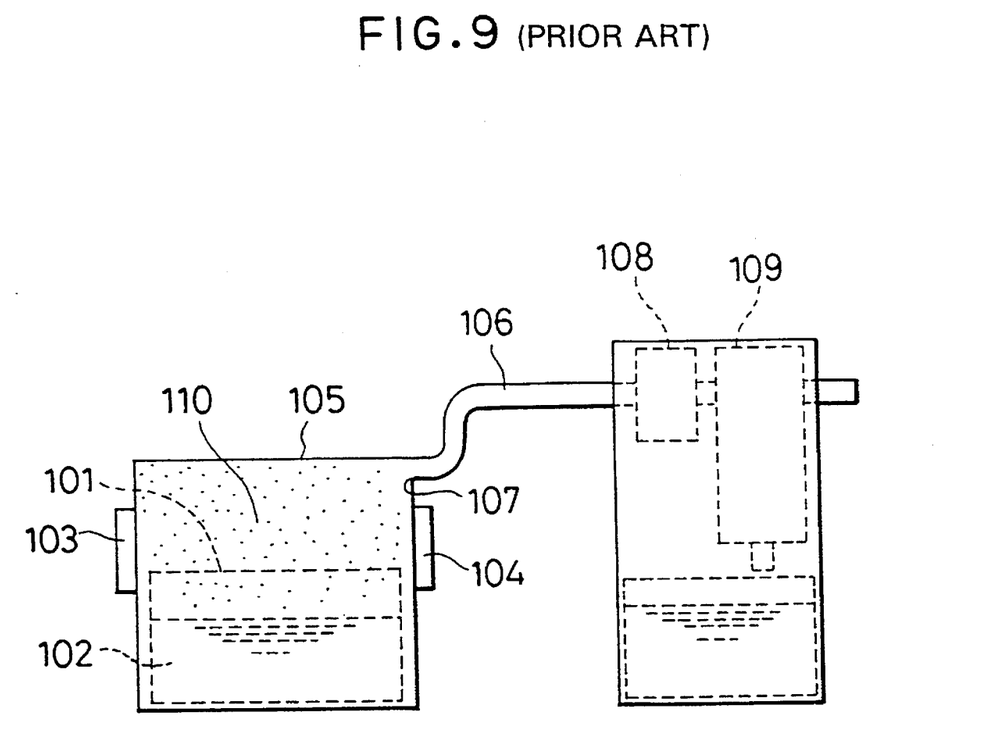
FIG. 9 is a schematic view of a conventional gas recovering apparatus.

A conventional apparatus of the above-described type is generally constructed in the manner shown in FIG. 9. In FIG. 9, a container 101, which may be a cleaning tank, contains solvent 102. A work inlet 103 and a work outlet 104 are provided to the container 101. A cover 105 is formed at an upper portion of the container 101. A suction pipe 106 is provided to the cover 105 at an opening 107 in the cover 105. Reference numeral 108 denotes a suction device. Reference numeral 109 denotes a recovering device of the solvent 102 which employs activated carbon. Reference numeral 110 denotes vapor of the solvent 102 mixed with air. A work piece or an object to be cleaned which is not shown is inserted from the inlet 103 into the solvent 102, cleaned with the solvent 102 and then taken out through the outlet 104, during which the suction device 108 is operated to suck the vapor 110 of the solvent 102 mixed with air through the opening 107 and the suction pipe 106. The gas 110, which has been sucked together with air flowed in through the inlet 103 and the outlet 104, is sent to the recovering device 109, then the solvent 102 is recovered from the vapor 110.

The above-described conventional apparatus has the following disadvantages.

The recovering device 109 must be built quite large in size because the apparatus requires a large quantity of activated carbon to concentrate the vapor 110 which contains quite a low density of solvent gas. Therefore, the suction device 108 consumes a large amount of power for sucking a large quantity of vapor.

Further, quality of recovered solvent may be deteriorated, e.g., the recovered solvent may be oxidized and the composition of a stabilizer added to the solvent may be imbalanced in the process of said recovering. This will lead to deterioration of quality of the activated carbon.

Therefore, conventional apparatus is expensive.

SUMMARY OF THE INVENTION

The present invention is directed to overcoming the above-mentioned problems, and an object thereof is to provide a method of sucking solvent vapor which requires a small quantity of air to suck the vapor and thus requires much less power than the above-described conventional apparatus does, as well as an apparatus for effectively recovering solvent.

To overcome the above-described problems, the present invention employs a condensation recovering apparatus, which still has the following problems.

The recovering apparatus employs pumps at various sites to convey liquid solvent. The liquid gradually melts packings of said pumps, thus shortening the life of the apparatus.

Another problem is that a condensation recovering device capable of effective condensation recovery is not known.

Further, recovering efficiency of the condensation recovering apparatus may drop a predetermined period of time after the operation of the apparatus is started.

The present invention is directed to solving the above-described problems, and an object thereof is to provide a vapor recovering apparatus which has a relatively long life.

Another object of the present invention is to provide a condensation recovering device which is capable of effective recovery.

Still another object of the present invention is to provide a method of operating a condensation recovering apparatus which enables vapor to be recovered without reducing recovering efficiency when recovering efficiency has dropped, and a condensation recovering apparatus which can be operated without reducing recovering efficiency when recovering efficiency has dropped.

When the solvent vapor is recovered, if the cleaning machine employing a solvent is of a sealed type, the product must be taken out to the outside of the cleaning machine for drying. An object of the present invention is to provide a solvent vapor recovering apparatus which can eliminate a trouble of taking the product to the outside of the cleaning machine for drying and which enables the product to be dried inside the cleaning machine.

To achieve the above-described objects, the present invention provides a solvent vapor sucking method which comprises sucking vapor of a solvent contained in a container through a suction pipe connected to said container at a position between the surface of said solvent and the upper edge of said container.

The present invention further provides a solvent vapor sucking method which comprises the steps of containing a solvent in a container, which is provided with a heater thereunder and cooling device therein, in such a manner that the surface of said solvent is located below said cooling device, and sucking vapor of said solvent through a suction pipe connected to said container in such a manner that an opening of said pipe is located at a position between the surface of said solvent and the upper edge of said container in a state where said heater and said cooling device are operated.

The present invention further provides a solvent recovering apparatus which comprises a container for containing a solvent, a suction pipe, connected to said container, of which an opening is located at a position below the upper edge of said container, a suction device connected with said container by means of said suction pipe and a solvent recovering device connected to said suction device.

The present invention further provides a solvent recovering apparatus which comprises a solvent container provided with a heater thereunder, a cooling device provided inside said container, a suction pipe connected to container in such a manner that an opening of said pipe is located at a position below the upper edge of said container, a suction device connected with said container by means of said suction pipe and a solvent recovering device connected to said suction device.

The solvent recovering device of the solvent recovering apparatus includes a condenser and a low-temperature condenser.

The solvent recovering device includes at least two low-temperature condensers and a control device for replacing one low-temperature condenser with another low-temperature condenser when condensation efficiency has been reduced.

The present invention provides a solvent vapor recovering method which comprises the steps of sucking vapor of a solvent by a suction device, condensing and recovering said sucked vapor by a condenser, and further recovering vapor which has not been recovered by said condenser by one of at least two low-temperature condensers for condensing vapor at a lower temperature than the temperature in condensing by said condenser, wherein a low-temperature condenser is replaced with another low-temperature condenser when the condensation efficiency is reduced.

The present invention further provides a solvent vapor recovering apparatus which comprises a suction device for sucking vapor of solvent, a condenser for condensing said vapor sucked by said suction device, at least two low-temperature condensers for condensing vapor at a lover temperature than the temperature in condensing by said condenser, said low-temperature condensers being connected in parallel to said condenser with a tank therebetween and a control device for alternately operating said low-temperature condensers by stopping the operation of one low-temperature condenser when the recovery efficiency thereof is reduced, and then by starting another low-temperature condenser in turn.

The present invention further provides a gas condensing/recovering apparatus which comprises a compressor provided with a suction passage having a suction port, a tank for containing recovered liquid connected to said compressor by means of a condenser, a supply port connected to said tank by means of a water separator, a low-temperature condenser connected to said tank and a refrigerator connected to said low-temperature condenser.

The present invention further provides a gas condensing/recovering apparatus which comprises a cylindrical housing for a low-temperature condenser, a cooling coil helically provided in said housing, a refrigerator connected to said coil, a gas supplying port formed at one side of said housing, a gas discharging port formed at the other side of said housing, a gas recovering port formed at the bottom of said housing and a plate member inserted between each adjacent spiral of said coil, said plate member having an incision extending from a point of the edge to the center thereof, and the each piece formed by said incision being bent in the opposite directions to each other.

The present invention further provides a gas cooling/recovering apparatus which comprises a refrigerator provided with a condensing device and a compressor connected to each other and a gas passage provided with a condenser, a low-temperature condenser and a liquid recovering port, wherein a first coil of said condenser is connected to said condensing device by means of a first expansion valve or a capillary tube, said first coil is connected to said compressor by means of an ejector, a second coil of a low-temperature condenser is connected to said condensing device by means of a second expansion coil or a capillary tube, and said second coil is connected to said compressor by means of said ejector.

DETAILED DESCRIPTION OF THE INVENTION

Figure 1:
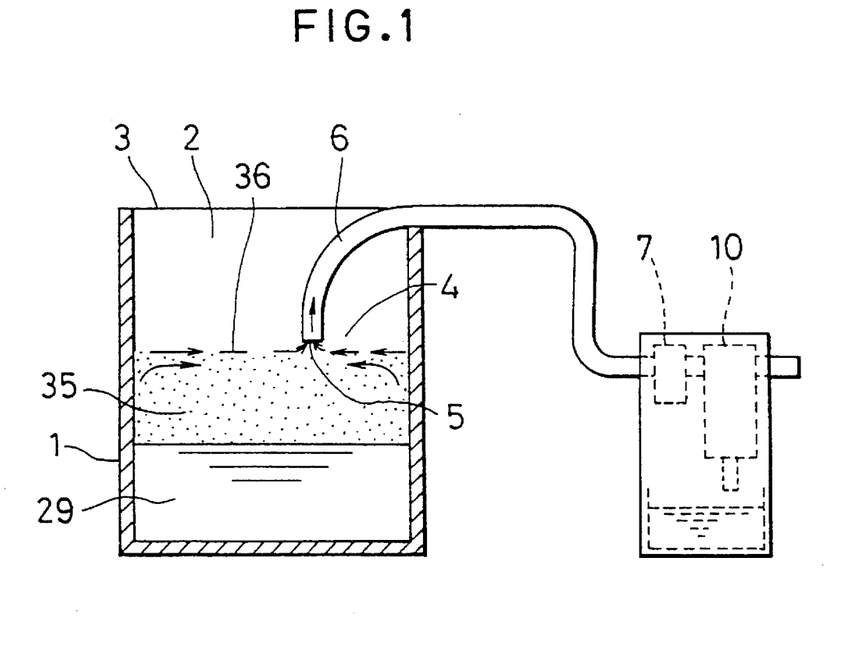
FIG. 1 is a schematic view of an embodiment of a solvent recovering apparatus employing a gas suction device according to the present invention.
Figure 2:
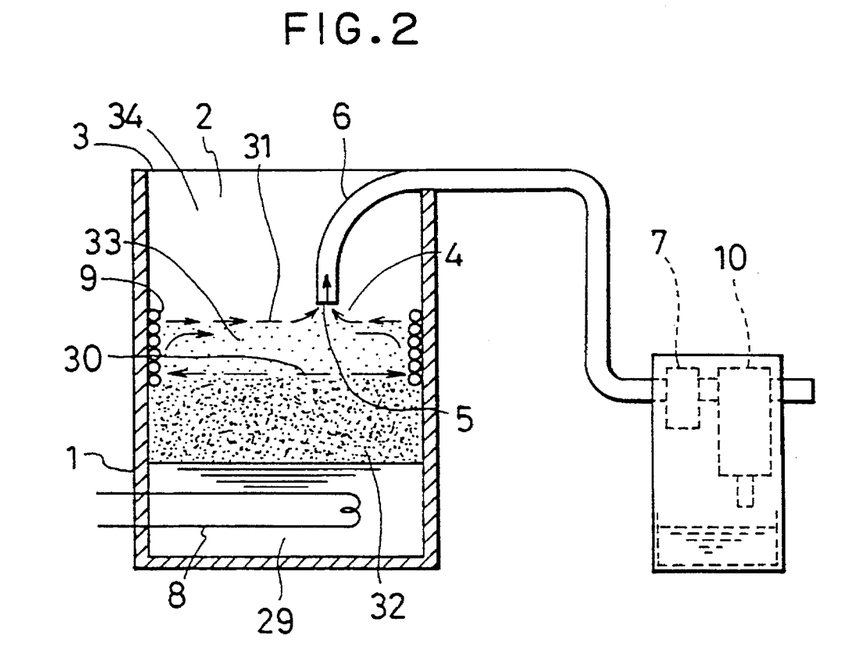
FIG. 2 is a view similar to FIG. 1 showing another embodiment of the present invention.
Figure 3:
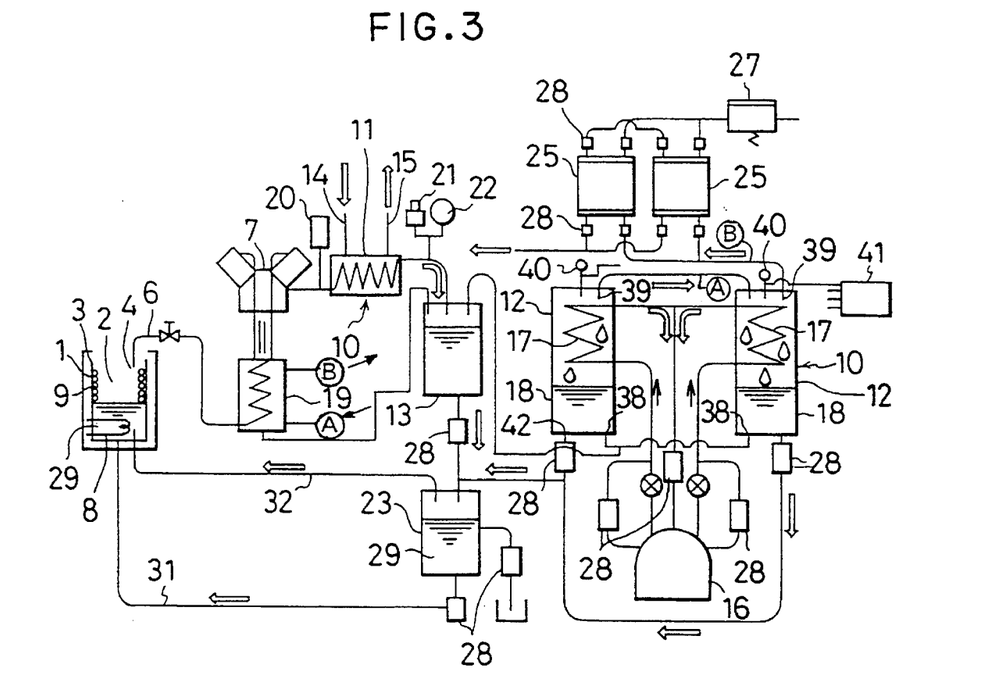
FIG. 3 shows the embodiment of FIG. 2 in detail.

Referring to FIGS. 1 through 3, reference numeral 1 denotes a container which may be a cleaning tank. A suction pipe 6, having an opening 5 at a position 4 below the upper edge 3 of the container 1, is provided in an interior 2 thereof. Reference numeral 7 denotes a suction device.

In FIGS. 2 and 3, reference numeral 8 denotes a heater provided in the container 1. Reference numeral 9 denotes a cooling device. The cooling device 9 is a coiled pipe through which cooling water passes.

The suction device 7 shown in FIG. 3 employs a compressor to suck solvent vapor and to compress the sucked vapor to prepare it for condensation at a subsequent stage.

A solvent recovering device 10 includes a water-cooled condenser 11 and low-temperature condensers 12. The condenser 11 is combined with the compressor serving as the suction device 7. The vapor, which has been compressed and condensed by the combination of the compressor and the condenser 11 and liquified, flows into a tank 13. Reference numerals 14 and 15 respectively denote an inlet and an outlet of the cooling water. The cooling water circulates in the condenser 11 during operation thereof.

The low-temperature condensers 12, which are operated in sequence, are cooled to, for example, −40° C. by a refrigerator 16. The liquid, condensed from the solvent vapor, falls along fins 17 of the condensers 12 and flows into a tank 18. In the solvent recovering device 10, part of the solvent vapor is recovered by the water-cooled condenser 11, and the remaining vapor is recovered by the low-temperature condensers Reference numeral 19 denotes a pre-cooling condenser having the same structure as that of the condenser 11. The pre-cooling device 19 is connected to discharge ports 39 by means of pipes A, B so that it can be cooled by the cooling air discharged from the discharge ports 39. The liquid condensed from part of the solvent vapor falls into the tank 13. In this way, the cooling air discharged from the discharge ports 39 is utilized without waste for recovering the solvent, while condensation in the condenser 11 is facilitated by sending the pre-cooled vapor to the condenser 11.

Reference numeral 20 denotes a safety valve. Reference numeral 21 denotes a pressure switch. Reference numeral 22 denotes a pressure gauge. Reference numeral 23 denotes a water separator.

Reference numeral 25 denotes an absorption device employing an activated carbon. Provision of the absorption device 25 enables complete recovery of the remaining solvent, therefore, the device 25 is not always necessary. Thus, the device 25 can be made smaller than a conventional activated carbon absorption device. Reference numeral 27 denotes a needle valve. Reference numeral 28 denotes an electromagnetic valve. Reference numeral 29 denotes a solvent. Reference numeral 40 denotes a pressure sensor provided in the low-temperature condenser 12. The pressure sensor 40 is connected to a control device 41 which is designed to operate the low-temperature condensers 12 one at a time. When the pressure in one low-temperature condenser 12 which is in operation has increased to a normal pressure or above, the control device 41 stops the operation of that low-temperature condenser 12 by operating the corresponding electromagnetic valve 28, start the operation of another low-temperature condenser 12. The low-temperature condenser 12 of which operation has been stopped is left at a normal temperature for thawing. When the pressure in one low-temperature condenser 12 rises to the predetermined value, switching between the low-temperature condensers 12 may be performed using a timer or the like without using the pressure sensor 40. Increase in the pressure of the low-temperature condenser 12 occurs because the gas outlet will be narrowed due to frozen vapor and solvent. In that state, the fins of the low-temperature condenser 12 are iced, deteriorating heat exchange and hence reducing condensation efficiency. The control device 41 is connected to the refrigerator 16, to the suction device 7 and to all the electromagnetic valves.

The inventors conducted tests using the apparatus arranged in the manner described above to examine changes of the amount of solvent sucked by varying suction air capacity and distances between the suction pipe 6 and the surface of the solvent 29. These tests were performed by using both an apparatus with which solvent is kept room temperature as shown in FIG. 1 (Table 1) and an apparatus with which solvent is warmed by the equipped heater 8 as shown in FIG. 2 (Table 2). The results of the tests are shown in Tables 1 and 2. The opening of the container 1 was 0.5 m² in area. In the Tables, "pipe height" indicates distance between the surface of the solvent and the opening 5. "Air quantity" indicates air capacity of the suction device 7.

The numerals in the Tables, obtained by the tests, show the amounts of solvent recovered per hour. The unit of the amount of solvent is ×300 cc in both Tables.

TABLE 1

| | (Room temperature) | | | |
|---|---|---|---|---|
| Pipe height Air quantity | 50 mm | 150 mm | 250 mm | 350 mm |
| 100 m³/min | 0.55 | 0.30 | 0.17 | 0.13 |
| 150 | 0.72 | 0.35 | 0.18 | 0.14 |
| 500 | 1.70 | 0.50 | 0.25 | 0.15 |
| 1,500 | 3.75 | 0.75 | 0.30 | 0.15 |

TABLE 2

| | (Warmed) | | | |
|---|---|---|---|---|
| Pipe height Air quantity | 50 mm | 150 mm | 250 mm | 300 mm |
| 100 m³/min | 3.0 | 0.87 | 0.47 | 0.36 |
| 200 | 4.0 | 1.12 | 0.50 | 0.40 |
| 500 | 7.0 | 1.80 | 0.75 | 0.50 |
| 1,500 | 15.0 | 2.85 | 0.90 | 0.54 |

As can be seen from the Tables, the amount of solvent recovered increases as the distance from the surface of the solvent reduces and the air quantity increases. However, at a certain height or above, the amounts of solvent recovered are getting fixed regardless of air quantity. This indicates that the more power of suction is increased, the more the suction air quantity is increased, and the more the suction port is lowered, the more the amount of solvent vapor supplied is increased, while the amount of vapor which spontaneously escapes from the apparatus decreases, so that the amounts of solvent vapor recovered are constant regardless of air quantity.

Thus, when a work to be cleaned is not moving, the solvent vapor stays still without escaping outside, so that all the vapor can be collected even if the suction inlet is at a higher position. When a work is moving, the suction inlet is required to be positioned close to the surface of the solvent or to the first vapor surface (discussed later), because the vapor in the container is very active, and thus the vapor escapes to the outside of the apparatus. Therefore, it appears that suction with a small quantity of air and at a high concentration of vapor is most efficient.

The function of the present invention will now be described. Firstly, preparing an apparatus which is not provided with either a heater 8 or a cooling device 9, a work is cleaned in a solvent 29 contained in a container 1 of the apparatus. At that time, vapor is generated from the solvent 29. When the suction device 7 and the recovering device 10 is operated, i.e., when suction is started, the vapor forms a horizontal surface near the opening 5 of the suction pipe 6, and is sucked after it has moved horizontally along the surface. At the same time, the area between the surface of the solvent 29 and the surface of the vapor surface forms a vapor zone having a substantially uniform high concentration.

This phenomenon is similar to overflow of the liquid.

The formed vapor surface restricts upward diffusion of the liquid. Particularly in that state, suction can be made at with a small quantity of air. Comparing the quantity of air required in case of a conventional recovering device (which employs activated carbon) on the same scale is used, suction air quantity of conventional apparatus is 101 m³/min. and suction air quantity of the apparatus of this invention is 100 m³/min to achieve equivalent effect.

Suction with a small quantity of air may be performed utilizing natural suction resulting from cooling condensation. However, natural suction itself is insufficient to restrict upward diffusion of the liquid. Therefore, suctioning by the suction device 7 with an appropriate small quantity of air is required.

In the suction of this invention, since the solvent vapor is sucked at the surface of vapor of which the concentration is far higher than that in a conventional device, it is not necessary to perform concentrated absorption using activated carbon because the vapor can be recovered by condensation. Consequently, the apparatus can be built smaller than a conventional apparatus which employs activated carbon.

Secondly, preparing an apparatus which is provided with both a heater 8 and a cooling device 9, a work is cleaned in a warmed solvent 29, during which the solvent is evaporated. When the cooling device 9 is operated in that state, the vapor is condensed, liquefied and then recovered. In this case, a negative pressure is generated in the vicinity of the cooling device 9, whereby the solvent vapor near the cooling device 9 is attracted toward and brought into contact with the cooling device 9 and liquefied. The vapor present on the surface moves horizontally due to the negative pressure, and thus forms a thick vapor zone having a vapor plane surface.

The vapor zone and the surface are referred to as a first vapor surface and a first vapor zone respectively.

When the recovering device 10 is operated in that state, part of the vapor diffused from the first vapor surface forms a second vapor surface and a second vapor zone. The first and second vapor surfaces restrict diffusion of a large amount of warmed vapor.

In this case, suction of a high-concentration vapor can be performed with a small quantity of air, as well as described in the first case. Accordingly, only condensation is required to recover the solvent without performing concentration employing activated carbon. Consequently, the recovering apparatus can be built smaller in size and compact.

The operation of the apparatus according to the present invention will be described below.

Trichloroethylene is used as a solvent. The suction device is operated in the manner which has been described in the description of the function. That is, in the apparatus shown in FIG. 2 in which the heater 8 and the cooling pipe 9 are provided, first and second vapor surfaces 30 and 31 are generated, as shown in FIG. 2. The first vapor surface 30 is generated below the cooling device 9, and the second vapor surface 31 is generated below the suction pipe 6. The phenomenon is observed by the present inventors in the experiments.

Where trichloroethylene is used, density of the first vapor zone 32 is approximately 1,000,000 PPM. Density of the second vapor zone 33 is approximately 500,000 PPM. And density of a space 34 above the second vapor surface 31 is approximately between several tens and several hundreds PPM.

Figure 4:
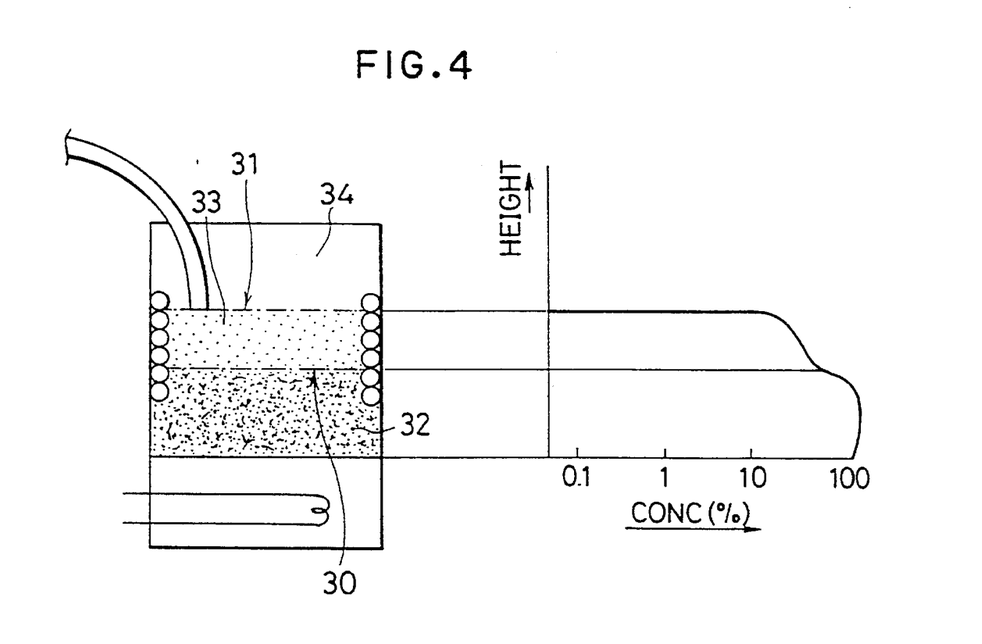
FIG. 4 is a graph illustrating the relation between first and second vapor surfaces and the concentration of solvent vapor.

Relation between density of the first and the second vapor surfaces and the solvent vapor is shown in FIG. 4.

In the apparatus shown in FIG. 1 without heater 8, a vapor zone 35 having a concentration similar to that of the second vapor zone and a vapor surface 36 having a concentration similar to that of the second vapor surface are generated during suction.

Therefore, in either case, a high-concentration solvent vapor can be sucked: Next, part of the sucked vapor is liquified by the compressor of the suction device 7 and the condenser 11. The small amount of remaining vapor is liquefied by the low-temperature condensers 12. The recovered liquids are returned to the container 1 through the water separator 23.

Hence, the provision of the absorption device 25 employing activated carbon is not mandatory but optional.

In the present invention, since a high-concentration solvent vapor can be sucked with a small quantity of air, the power of the suction device can be greatly reduced from that required for a conventional device. Since vapor absorption by an activated carbon device, required for a conventional apparatus is not necessary for the same reasons as the above-mentioned reasons and the solvent vapor can thus be recovered only by condensation, the apparatus can be built smaller in size and compact.

Further, since recovery is performed only by condensation, the quality of a recovered solvent is far better than that of the conventional recovering method employing activated carbon. Thus, the recovered solvent can be reused without reprocessing.

Further, since the low-temperature condensers 12 are operated alternately by automatically stopping the operation of the low-temperature condenser whose condensation efficiency has been reduced by the control device 41 and by operating other low-temperature condensers by turns, a high efficiency operation can be achieved.

Figure 6:
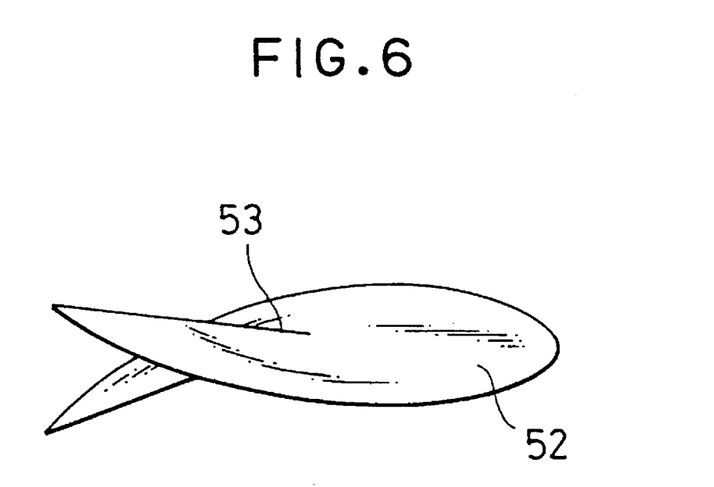
FIG. 6 is a perspective view of a portion of the device showing still another embodiment of the present invention.
Figure 7:
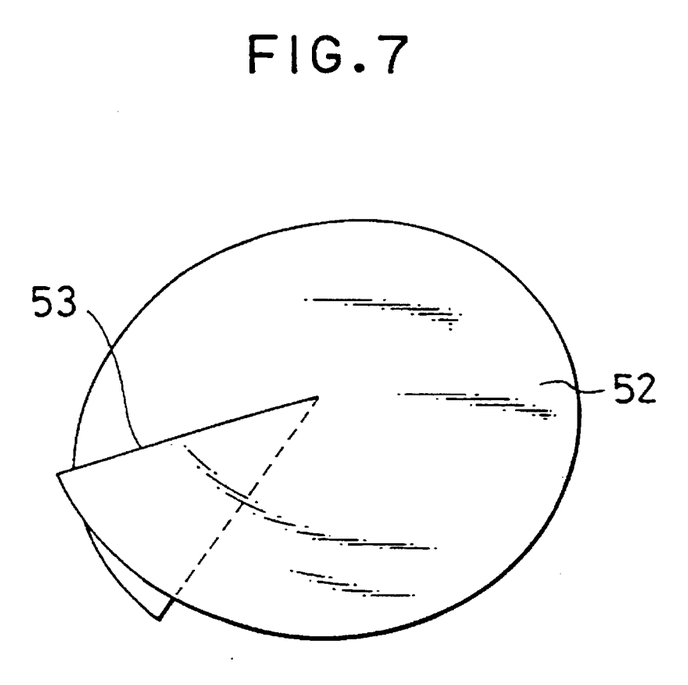
FIG. 7 is a perspective view of the portion shown in FIG. 6.

The low-temperature condenser 12 includes a tank 18 and a helical cooling coil 17 which communicates with the refrigerator 16. Reference numeral 38 denotes a gas supply port. Reference numeral 39 denotes a discharge port. Reference numeral 42 denotes a recovery port. A plate member 52 such as that shown in FIGS. 6 and 7 is provided between adjacent helices of the coil 17 of the low-temperature condenser 12. The plate member 52 is made of a synthetic resin, and has an incision 53 between an outer periphery and a central portion thereof. The two sides of the incision 53 are curved in opposite directions. The plate members 52 are provided in layers substantially in a spiral fashion to increase the length of a gas passage and to restrict icing of the coil 17 and the low-temperature condensers 12.

Figure 5:
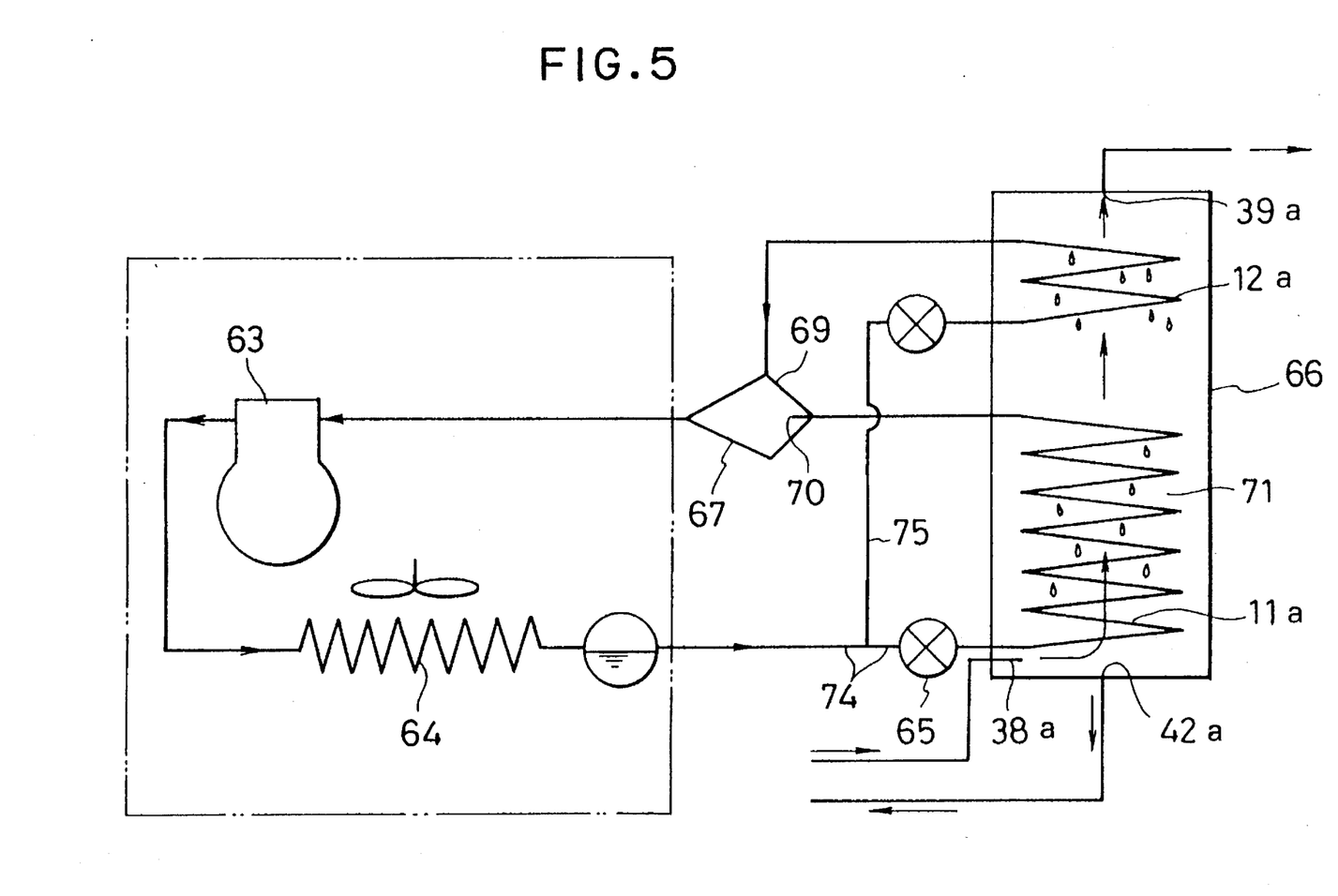
FIG. 5 is a schematic view of a gas condensing/recovering device showing still another embodiment of the present invention.

Still another embodiment of the present invention will be described below with reference to FIG. 5. In FIG. 5, reference numeral 63 denotes a compressor of a refrigerator. Reference numeral 64 denotes a condenser of the refrigerator. Reference numeral 65 denotes a first expansion valve or a capillary tube. A condenser 11a of a cooling device 66 is connected to the first expansion valve or capillary tube 65. The condenser 11a connected to the compressor 63 by means of an ejector 67. A low-temperature condenser 12a of the cooling device 66 is connected to a suction portion 69 of the ejector 67, whereby the vapor is pre-cooled to −30° C. by the condenser 11a, and the low-temperature condenser 12a is evacuated by the ejector 67, and then further cooled to, for example, −50° C. to −80° C. by the low-temperature condenser 12a.

It is therefore possible to recover the vapor which cannot be otherwise readily liquefied. Reference numeral 70 denotes a nozzle of the ejector 67.

The cooling device 66 is shaped in the form of, for example, a sealed container. The cooling device 66 has a gas supply port 38a, a discharge port 39a and a liquid recovering port 42a. Reference numeral 71 denotes a gas passage.

In FIG. 5, an inner diameter of a pipe 74 is larger than that of a pipe 75 so that a difference in the amount of gas supplied can be produced.

Thus, the device shown in FIG. 5 according to the present invention can readily recover the vapor which may not otherwise be readily liquefied.

Figure 8:
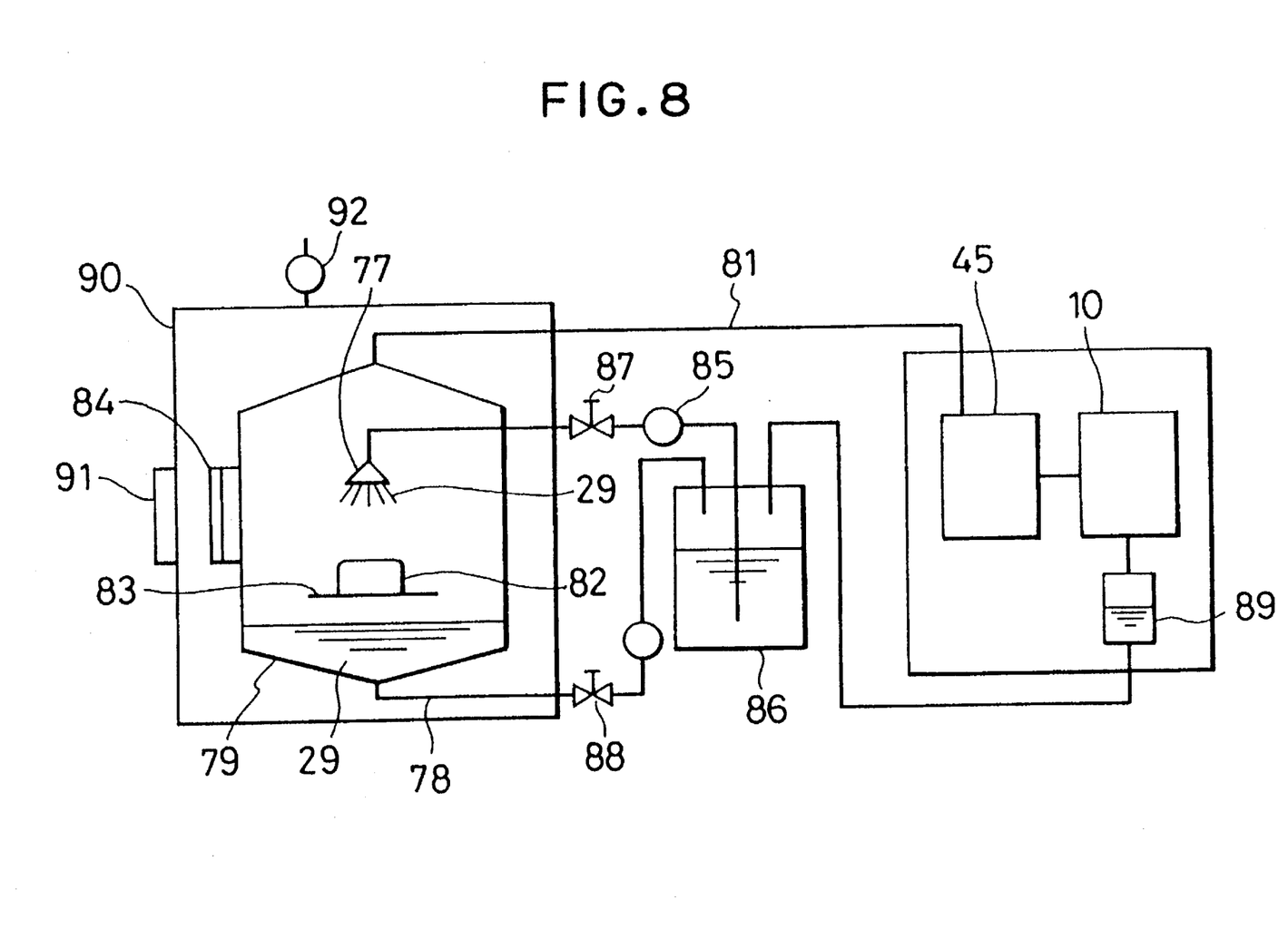
FIG. 8 is a schematic view of a solvent recovering apparatus employing a sealed type cleaning machine showing still another embodiment of the present invention.

Referring to FIG. 8, reference numeral 77 denotes a supply portion of a solvent. Reference numeral 78 denotes a discharge portion of the solvent. Reference numeral 79 denotes a cleaning machine which can be sealed. Reference numeral 45 denotes a compressor. Reference numeral 10 denotes a recovering device for condensing vapor.

Reference numeral 81 denotes a connection pipe. Reference numeral 29 denotes a solvent which may be trichloroethylene, Reference numeral 82 denotes a work. Reference numeral 83 denotes a rotary table, Reference numeral 84 denotes a lid which can be sealed, Reference numeral 85 denotes a pump, Reference numeral 86 denotes a tank of the solvent, The supply portion 77 may be a shower, Reference numerals 87 and 88 denote valves. Reference numeral 89 denotes a recovering tank, Reference numeral 90 denotes a cover. Reference numeral 91 denotes a port of the cover 90. Reference numeral 92 identifies a fan located in a wall of the cover 90. The apparatus arranged in the manner described above will be operated in the manner described below: first, the lid 84 is opened, and the work 82 is placed on the rotary table 83. After the lid 84 is tightly closed, the pump 85 is operated to eject trichloroethylene from the supply portion 77 for cleaning. After cleaning is completed, the valve 87 is closed while the valve 88 is opened to cause trichloroethylene which has accumulated in the cleaning machine 79 to flow into a tank which is not shown. Trichloroethylene may be returned to the tank 86, as shown in FIG. 8. After all the trichloroethylene has flowed into the tank 86, the valves 87 and 88 are closed, and the compressor 45 is operated to suck the vapor of trichloroethylene into the cleaning machine 79.

Accordingly, the cleaning machine 79 is evacuated, and the work 82 is thereby vacuum dried. At the compression side of the compressor 45, sucked trichloroethylene is compressed and condensed by the compressor 45 and the recovering device 10. Liquefied trichloroethylene is returned to the recovering tank 89.

As described above, the recovering device 10 for recovering vapor is provided and connected to the cleaning machine 79 which can be sealed by means of compressor 45. Consequently, vacuum drying of the work and condensation/recovery of the solvent in the cleaning machine 79 can be performed simultaneously.

What is claimed is:

1. A solvent vapor suctioning method, comprising the step of:

providing a container having an opening at an edge for containing a liquid and vapor of a solvent, wherein said vapor lies above said liquid within said container;

providing a cooling device adjacent walls of said container above a liquid surface of said liquid for cooling said vapor; and suctioning said vapor from said container through a suction pipe disposed within said container, an inlet of said suction pipe oriented downwardly and disposed between a surface of said liquid and an upper edge of said container.

2. A solvent recovering apparatus comprising:

a container to contain a solvent, said container having an opening at the upper edge;

a suction pipe disposed within said container, said suction pipe having an opening located below said upper edge of said container, said opening of said suction pipe oriented downward;

a suction device in fluid communication with said container through said suction pipe; and a solvent recovering device connected to said suction device.

3. A solvent recovering apparatus according to claim 2, wherein said solvent recovering device includes a condenser and at least one low-temperature condenser.

4. A solvent recovering apparatus according to claim 3, wherein said solvent recovering apparatus includes:

at least two low-temperature condensers; and a control device for alternating between low-temperature condensers when a condensation efficiency of one low-temperature condenser has been reduced.

5. A solvent recovering apparatus comprising:

a solvent container provided with an opening at the upper part and a heater inside a lower part;

a cooling device inside of said container above said heater;

a suction pipe disposed within said container in such a manner that an opening of said pipe is located below the upper part of said container and above said heater, wherein an opening of said suction pipe is provided to face downward;

a suction device connected to said suction pipe; and a solvent recovering device connected to said suction device.

6. A solvent recovering apparatus according to claim 5, wherein said solvent recovering device includes a condenser and at least one low-temperature condenser.

7. A solvent recovering apparatus according to claim 6, wherein said solvent recovering apparatus includes:

at least two low-temperature condensers; and a control device for alternating between said low-temperature condensers when a condensation efficiency of one of the low-temperature condensers has been reduced.

8. A solvent vapor recovering method comprising the steps of:

suctioning a vapor from a solvent retained within a container by a suction device, wherein an opening of said suction device is oriented downward;

condensing and recovering said suctioned vapor by a condenser;

further recovering a remaining vapor of a solvent which has not been fully recovered by said condenser, by one of two low-temperature condensers that condense vapor at a lower temperature than the temperature used in initially condensing said vapor; and substituting one low-temperature condenser with another low-temperature condenser when a condensation efficiency of the former low-temperature condenser is reduced.

9. A solvent vapor recovering apparatus comprising:

a device for suctioning a vapor of a solvent retained in a container, wherein said container has an opening at the upper end;

a condenser associated with said device for condensing said vapor suctioned by said device;

at least two low-temperature condensers for condensing said vapor at a lower temperature than a temperature used in condensing said vapor by said condenser, said low-temperature condensers being connected in parallel to said condenser with a tank therebetween; and a control device alternately operating said low-temperature condensers by stopping the operation of one low-temperature condenser when a recovery efficiency thereof is reduced, and starting another low-temperature condenser in turn.

10. A method for recovering a vapor from a solvent, comprising the steps of:

providing a container having an opening at an upper end, a heater in a lower end, and a cooling device therein intermediate said upper and lower ends;

retaining a solvent in said container such that a liquid surface of said solvent is located below said cooling device, said solvent producing a vapor above said liquid surface; and drawing said vapor from said solvent through a suction pipe disposed within said container and having a downwardly facing inlet located between said cooling device and said upper end of said container.

* * * * *

UNITED STATES PATENT AND TRADEMARK OFFICE
CERTIFICATE OF CORRECTION

PATENT NO.  : 5,565,070
DATED       : October 15, 1996
INVENTOR(S) : Doi et al.

It is certified that error appears in the above-identified patent and that said Letters Patent is hereby corrected as shown below:

Col. 4, line 50, insert --12.-- between "condensers" and "Reference";

Col. 6, line 39, "101 m³/min." should be --10 m³/min.--; and

Col. 6, lines 40-41, "100 m³/min." should be --100 liter/min.--.

Signed and Sealed this

First Day of April, 1997

Attest:

BRUCE LEHMAN

*Attesting Officer*   *Commissioner of Patents and Trademarks*